ACTION REPRODUCTION APPARATUS

Filed July 10, 1959 8 Sheets-Sheet 1

Inventor:
Henry Projansky,
by Abbott Spear,
Attorney

Jan. 28, 1964 H. PROJANSKY 3,119,184

ACTION REPRODUCTION APPARATUS

Filed July 10, 1959 8 Sheets-Sheet 2

Inventor:
Henry Projansky,
by [signature]
Attorney

Inventor:
Henry Projansky
by
Attorney

Jan. 28, 1964 H. PROJANSKY 3,119,184

ACTION REPRODUCTION APPARATUS

Filed July 10, 1959 8 Sheets-Sheet 4

Inventor:
Henry Projansky,
by [signature]
Attorney

Jan. 28, 1964 H. PROJANSKY 3,119,184

ACTION REPRODUCTION APPARATUS

Filed July 10, 1959 8 Sheets-Sheet 5

Inventor:
Henry Projansky,
by Abbott Spear
Attorney

Inventor:
Henry Projansky,
by Abbott Spear
Attorney

Inventor:
Henry Projansky,
by Albert Spear
Attorney

Inventor:
Henry Projansky,
by Abbott Spear
Attorney

United States Patent Office 3,119,184
Patented Jan. 28, 1964

3,119,184
ACTION REPRODUCTION APPARATUS

Henry Projansky, 545 Beach St., Revere, Mass.

Filed July 10, 1959, Ser. No. 826,364
6 Claims. (Cl. 33—25)

Figure 1:
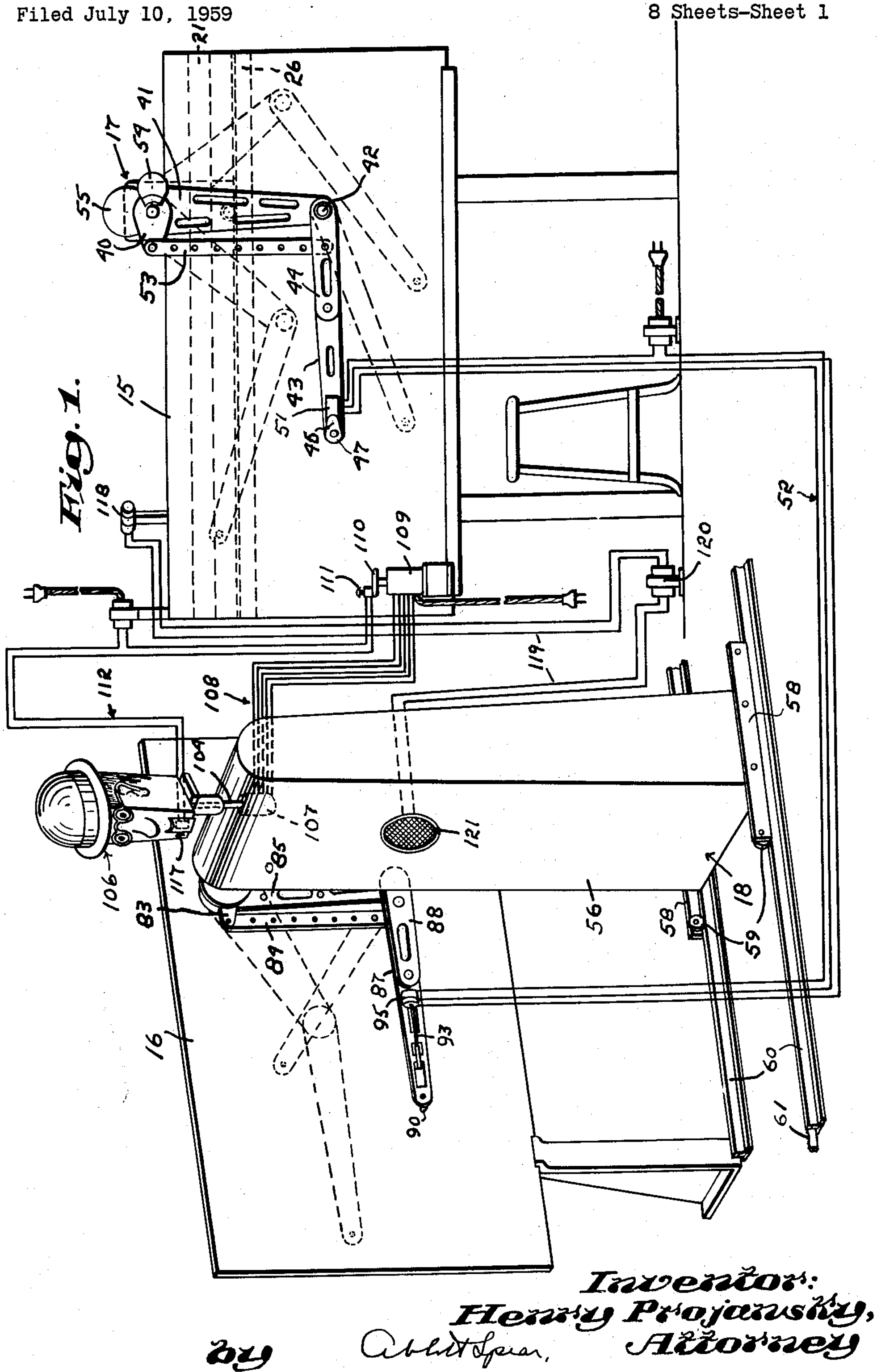

The present invention relates to apparatus for use in the reproduction of an action at a station spaced from that at which the action is being initiated.

While the invention is adapted for a wide range of uses, it is discussed herein primarily in the reproduction of drawings and other manual movements in television or other programs requiring illustrations and particularly those where advantages result in having a mannequin seemingly make the drawings or other movements.

The general objective of the present invention is to furnish apparatus for such uses and, in accordance with it, that objective is attained with apparatus including a unit at a first station where the action is to be reproduced and which is spaced from a unit at a second station where the action is initiated. Each unit has a support provided with a pair of concentric shafts, each having a gear and a member. One member is a crank and the other is a first arm part to which a second arm part is pivoted. A link, parallel to the first arm part, is pivotally connected to the second arm part and to the crank so that as either one or both arm parts moves, such movement is attended by the turning of either one or both shafts or vice versa. Where drawings are to be reproduced each second arm part is provided with a drawing tool engageable with an associated drawing board.

As the action is initiated at the second station the motion there imparted to either or both arm parts is transmitted to the first station and applied to the first station unit to cause corresponding movement of the arm part or parts thereof. While the motion transmitting means may be mechanical, fluid pressure operated, tape, or radio controlled, an electronic connection between the two units is preferred as ensuring most accurate movement of the arm parts of the second unit regardless of the distance between the stations.

Such a connection includes transmitting synchro-motors for the unit at the second station, one for each gear and driven thereby and receiving synchro-motors for the unit at the first station, one for each gear and connected thereto. The first station unit is also provided with servo motors, one for each gear of that unit and connected thereto to drive it in one direction or the other. In order that each servo motor may be run in response to an error signal resulting from movements at the second station, the circuit to each servo motor for such signals includes appropriate modifying and amplifying components.

A particular objective of the present invention is to provide that, when the apparatus is used to reproduce drawings, a term which also includes writing and figuring, each drawing tool has a normal inoperative position and an operative position which, in the case of the drawing tool at first station, is effected when a solenoid connected thereto is energized by the closing of a switch associated with the drawing tool at the second station which becomes closed when that drawing tool is manually moved into its operative position.

A further objective of the present invention is to provide means whereby each unit may be moved relative to the associated drawing boards and this objective is attained by mounting each unit on a track and employing power transmitting means to ensure the movement of the unit at the second station and is attended by corresponding movement of the first station unit. In preference to mechanical, fluid pressure operated, or other means, an electronic connection is used which includes transmitting and receiving synchro-motors carried by the supports at the second and first stations, respectively, with each including a gear meshing with an associated rack. The support at the first station has a servo motor provided with a drive gear meshing with the first station rack and in circuit with the transmitting synchro motor at the second station.

The nature of the arm parts and the ability of the first station unit to move relative to the first station drawing board adapts it for use as a mannequin and the provision of such a mannequin with a head that turns, a jaw that moves, and a loud speaker are further objects of this invention.

While apparatus in accordance with the invention is primarily discussed herein with reference to the reproduction of drawings as part of programs, whether educational, entertainment, or advertising, it will be appreciated that the ability of the mannequin to move its arm parts for other purposes is also important, particularly in association with another mannequin. In addition, the accurate response of the arm parts at the first station to movements initiated at the second station enables the apparatus to be used for a wide range of other purposes.

In the accompanying drawings there is shown an illustrative embodiment of the invention adapted for the reproduction of drawings from which these and other of its objectives, novel features, and advantages will be readily appreciated.

Figure 2:
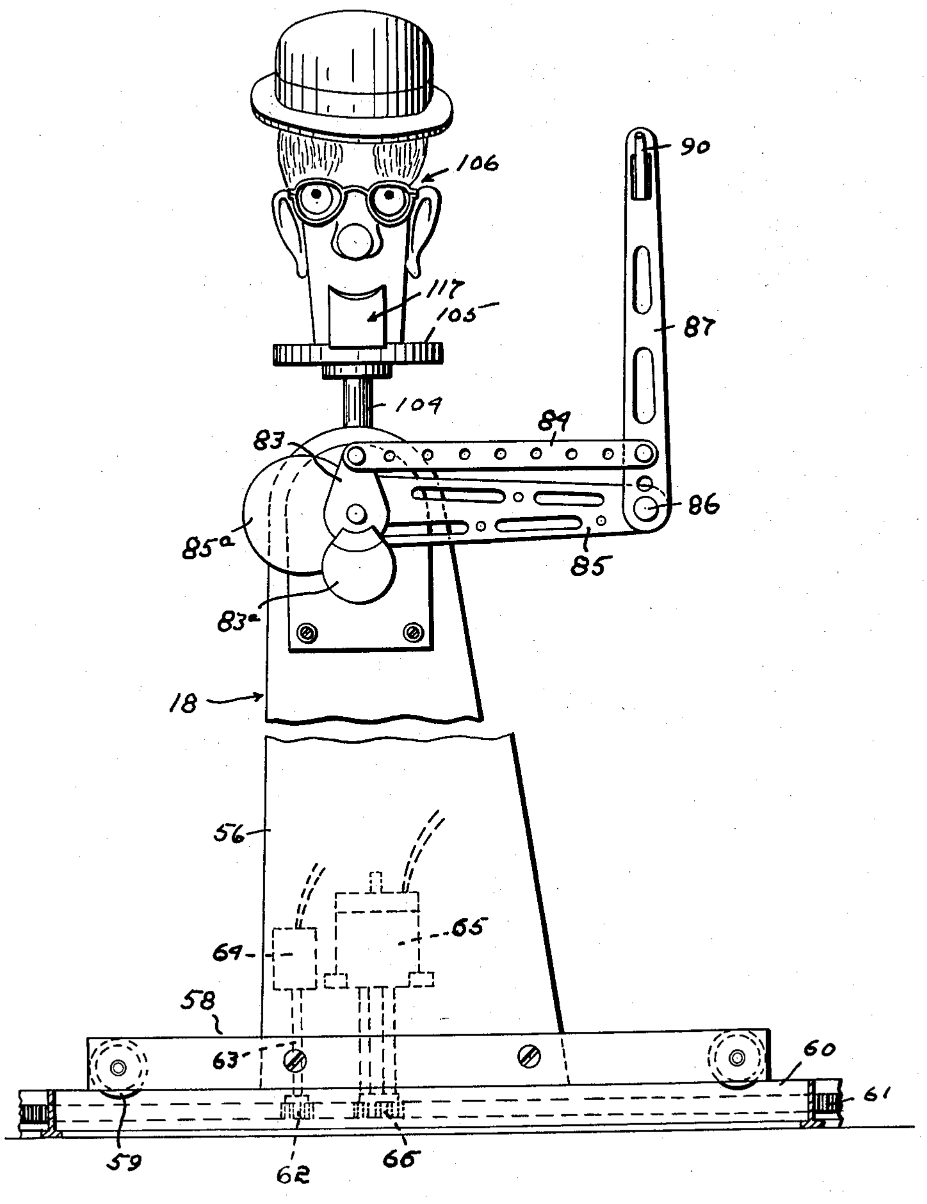

In the drawings:

FIG. 1 is a somewhat schematic view of apparatus in accordance with the invention, showing certain of the circuits, FIG. 2 is a front elevation of the mannequin at the first station.

Figures 3, 4:
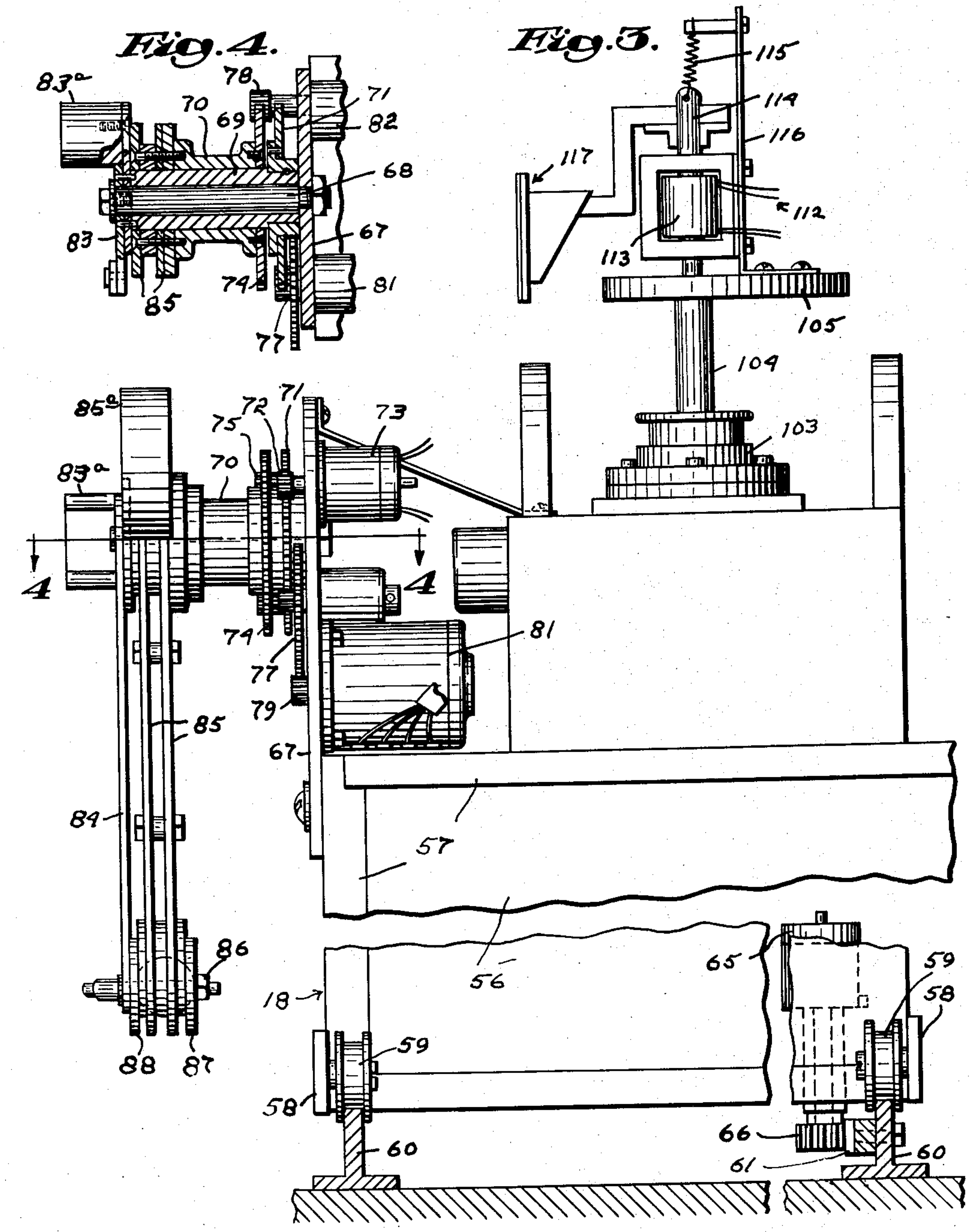
Figures 5, 6:
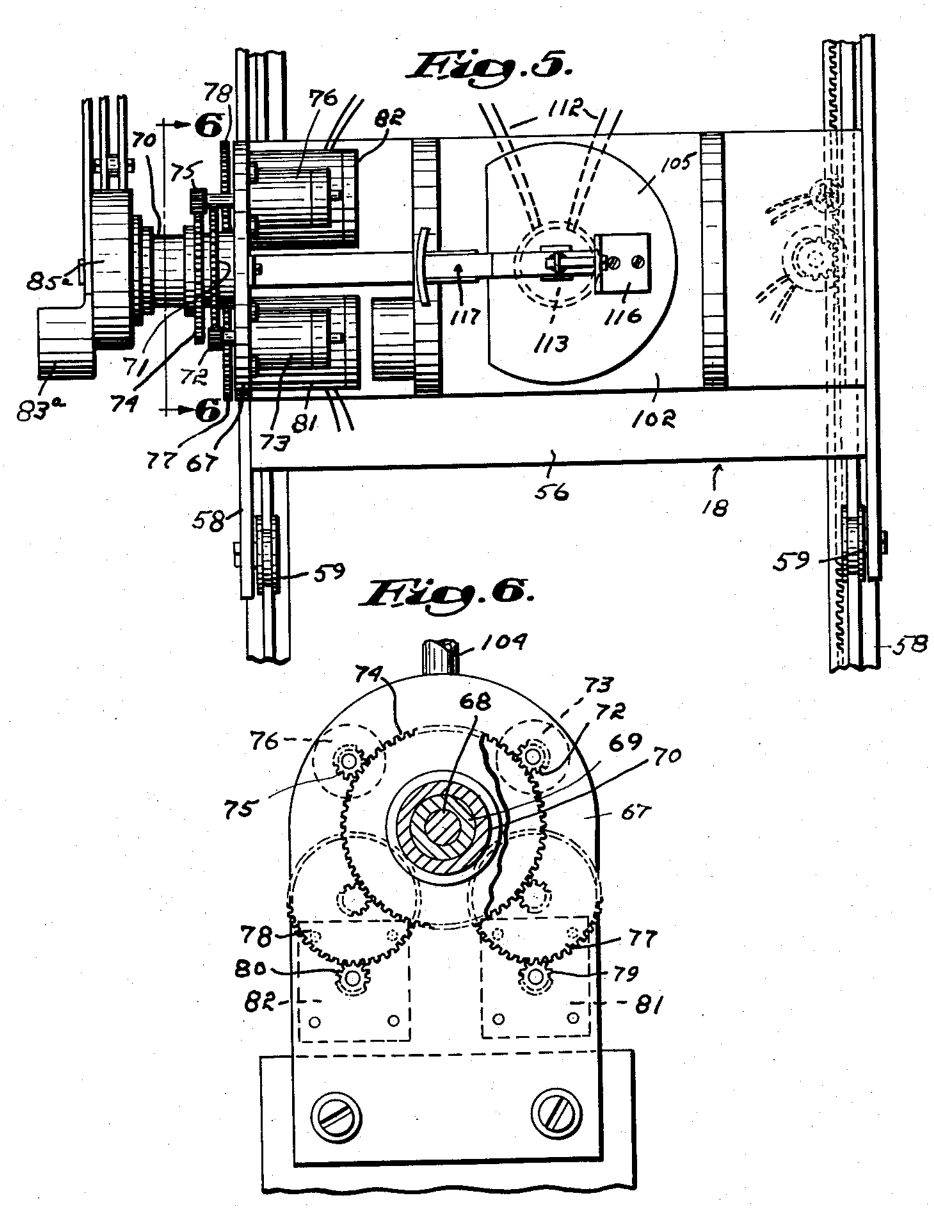
Figures 7, 8:
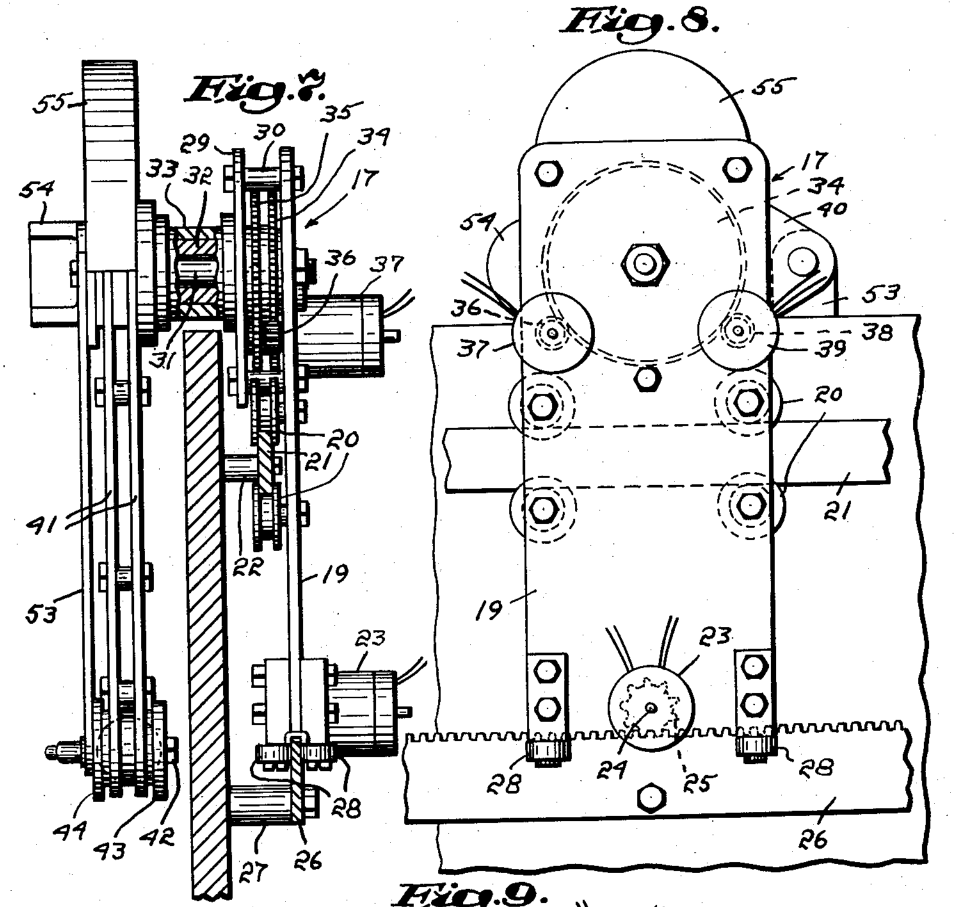
Figure 9:
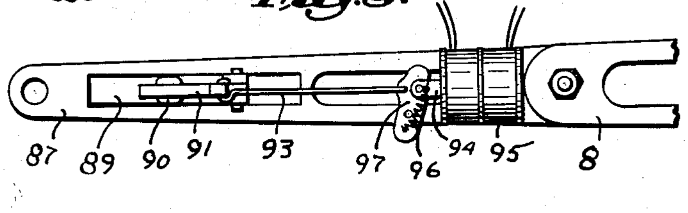
Figure 10:
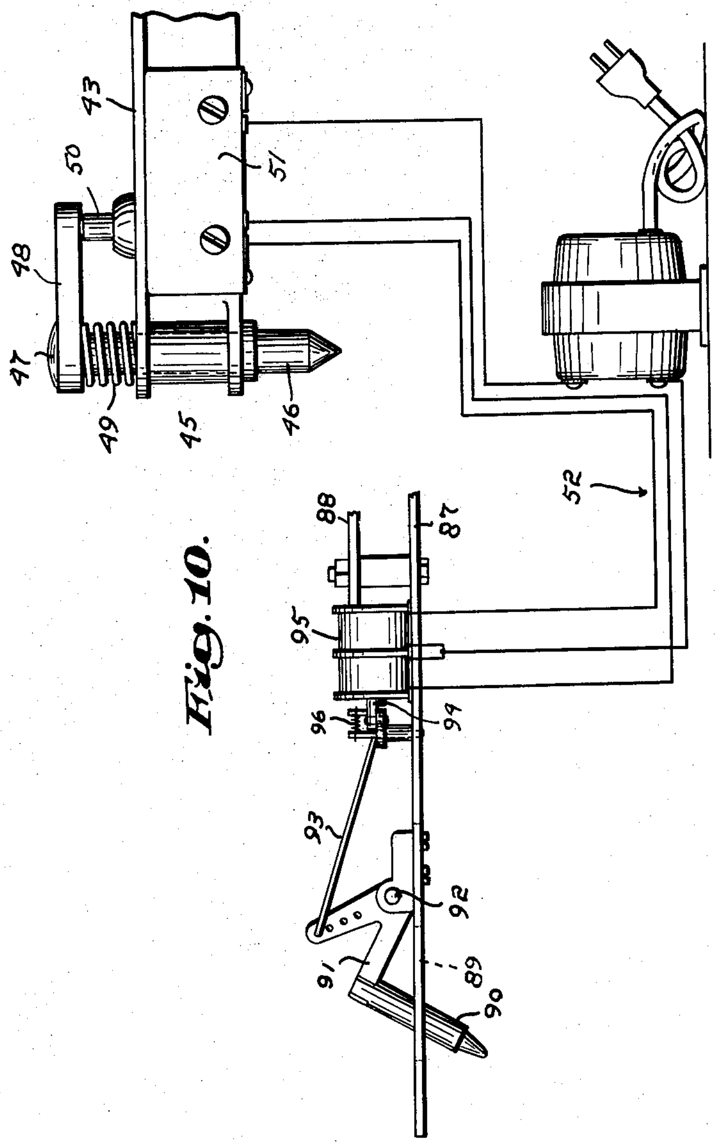
Figure 11:
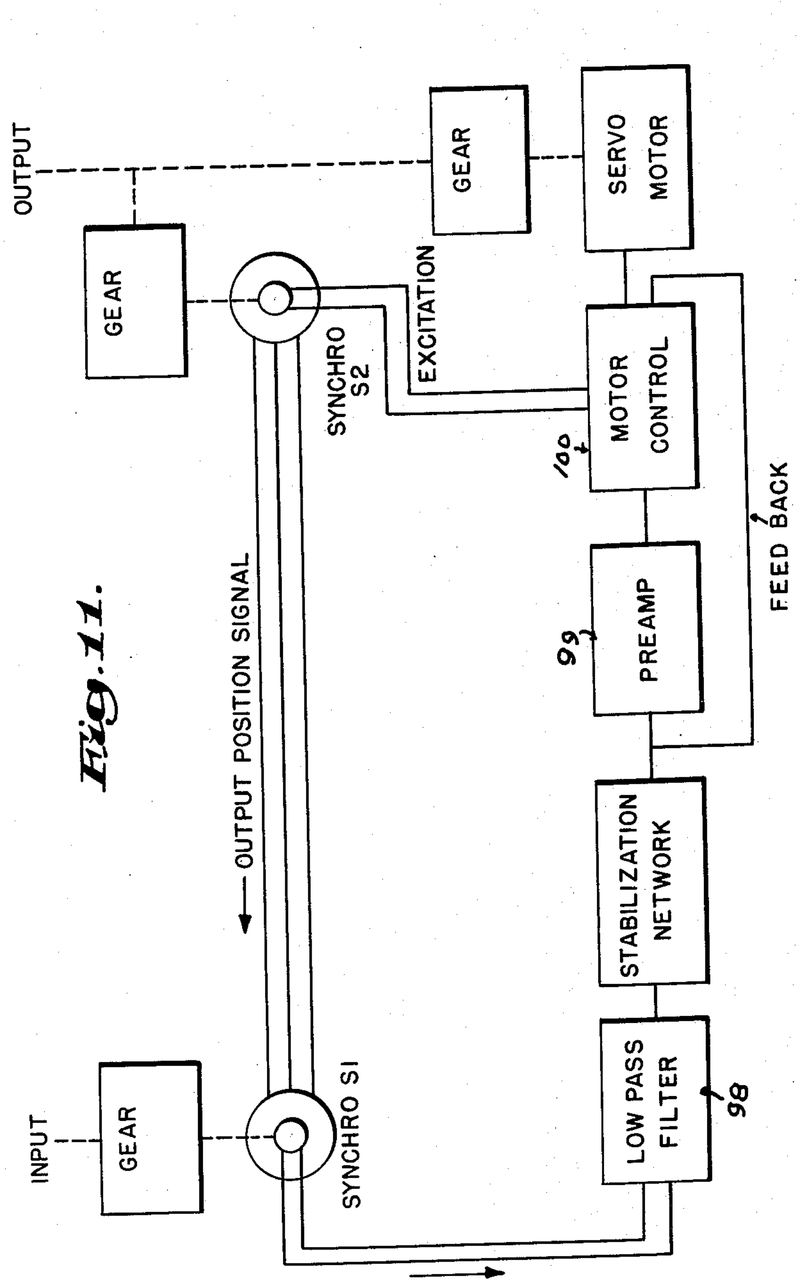
Figure 12:
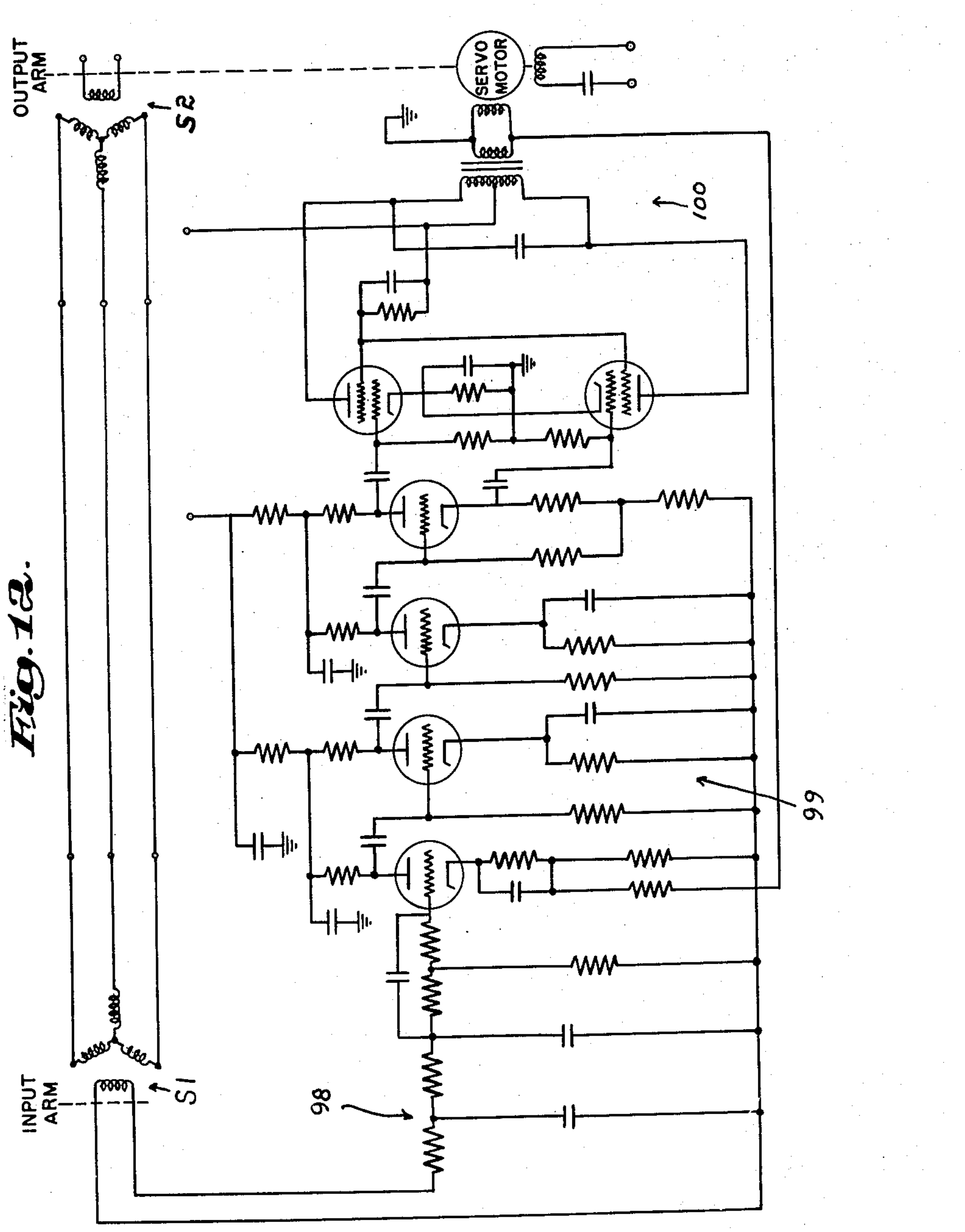

FIG. 3 is a fragmentary side view of the mannequin with part of its housing removed, FIG. 4 is a section taken approximately along the indicated lines 4—4 of FIG. 3, FIG. 5 is a top plan view of the mannequin with part of the head structure removed, FIG. 6 is a section taken approximately along the indicated lines 6—6 of FIG. 5, FIG. 7 is an edge view of the drawing unit at the second station, FIG. 8 is a rear view of the unit shown in FIG. 7, FIG. 9 is an elevation of the second arm part of the first station unit, FIG. 10 is a somewhat schematic view showing the drawing tools of the two second arms parts, FIG. 11 is a block diagram of FIG. 12 is a somewhat schematic view of the corresponding wiring diagram.

Reference is first made to FIG. 1 where there is shown a drawing board 15 at the station where the original drawing is made and a drawing board 16, spaced any distance from the drawing board 15 and located at the first station where the drawing is to be reproduced. At the former, there is shown a unit generally indicated at 17 and at the latter there is located a generally indicated unit 18.

The details of the unit 17 may be seen in FIGS. 1, 7 and 8 wherein there is shown a support 19 having upper and lower sets of flanged rollers 20 between which extends a supporting rail 21 attached to the rear face of the board 15, by spacers 22. The support 19 is also provided with a synchro motor 23 on whose shaft 24 there is a gear 25 meshing with a rack 26 attached to the rear face of the drawing board 15 by spacers 27. The support 19 is also provided with spaced rollers 28 engaging opposite faces of the rack 26.

A plate 29 is attached to the support 19 by spacers 30 and is provided with a spindle 31 shown as extending over the upper edge of the board 15 and rotatably supporting concentric shafts 32 and 33 provided with gears 34 and 35 respectively, on their rear ends. The gear 34 meshes with a gear 36 on the shaft of the synchro motor 37 and the gear 35 meshes with a gear 38 on the shaft of the synchro motor 39. The motors 37 and 39 are mounted on the rear face of the support 19.

The front end of the shaft 32 has a crank 40 fastened thereto while the shaft 33 is provided with a pair of spaced, interconnected members 41 which establish the first arm part. Connected to the free ends of the members 41, by the pivot 42, is a member 43 and a reinforcement 44 for the rear portion thereof and these, together, establish a second arm part. The member 43 has, at its free end, a holder 45, see FIG. 10, slidably supporting a drawing tool 46 for movement at right angles to the member 43 and to the drawing board 15. The drawing tool 46 may be of any type and its holder has a head 47 including an arm 48. The head 47 is engaged by a spring 49 yieldably maintaining the tool 46 in an inoperative position with reference to the board 15. The arm 48 engages the button 50 of a normally open switch 51, in a circuit 52, so that whenever the tool 46 is moved into an operative position, typically against the drawing board 15, the circuit 52 is closed.

A link 53, parallel to the first arm part 41, is pivotally connected to the second arm part 43 and to the crank 40. The crank 40 and the first arm part 41 are preferably counterweighted as at 54 and 55, respectively.

From the foregoing, it will be appreciated that when the drawing tool 46 is moved from its inoperative position into operative contact with the drawing board 15 and is moved relative thereto, either or both of the shafts 32 and 33 will turn in one direction or the other thereby to affect the associated synchro-motors.

In FIG. 1, the unit 18 is shown as a mannequin and includes a body simulating compartment 56 including a frame 57 and members 58 provided with rollers 59 engaging appropriately spaced rails 60. Associated with one of the rails 60 is a rack 61 with which meshes a pinion 62 on the shaft 63 of a synchro-motor 64 housed within the compartment 56. Within the compartment there is also a servo motor 65 having a gear 66 meshing with the rack 61.

At the side of the compartment 56 proximate to the drawing board 16, there is a plate 67 supported by the frame and having a stud 68 (see FIG. 4) rotatably supporting the concentric shafts 69 and 70. The shaft 69 is provided with a gear 71 meshing with the shaft gear 72 of the synchro motor 73 while the shaft 70 has a gear 74 meshing with the shaft gear 75 of the synchro-motor 76.

The plate 67 supports idler step gears 77 and 78 whose smaller portions mesh with the shaft gears 71 and 74, respectively, and whose larger portions mesh with driving gears 79 and 80, respectively. The gear 79 is on the drive shaft of a servo motor 81 and the gear 80 is on the drive shaft of a servo motor 82. The servo motors 81 and 82 are shown as bolted to the plate 67.

Fast on the other end of the shaft 69 is a crank 83, counterweighted as at $83^a$ to which is pivoted a link 84. The upper end of a pair of spaced, interconnected members 85 are fast on the corresponding end of the shaft 70 and these are counterweighted as at 85*a* and establish the first arm part which simulates the upper arm of the mannequin. Connected to the free ends of the members 85, by the pivot 86, is a member 87 and reinforcement 88 for the rear portion thereof and the link 84 is pivotably connected to the rear part of the member 87. The members 87 and 88 establish the second arm part and the member 87 has a slot 89 through which extends the drawing tool 90 fast on one arm of a bell crank 91 connected to the arm part 87 as by a pivot 92. The other arm of the bell crank 91 is connected by a link 93 to the plunger 94 of a solenoid 95 in the circuit 52. The solenoid 95 is of the double action type and is yieldably held in either position as by means of a spring 96 so connected to a lever 97 (see FIG. 9), attached to the solenoid plunger 94, as to be operative whenever a dead-center position is passed. As a consequence, whenever the switch 51 at the second station is closed, as an incident to the use of the drawing tool 46, the drawing tool 90 is operatively positioned. Whenever the switch 51 opens, the drawing tool 90 is returned to its inoperative position.

Synchro-motors are widely used where no current is to circulate so long as both rotors are in identical positions with respect to their stators, and circulation is wanted, when one is displaced unless and until the other is similarly displaced. With reference to FIGS. 11 and 12, synchro S1 may be any one of the transmitting synchro-motors 23, 37, and 39 and synchro S2 may be any corresponding one of the receiving synchro-motors 64, 73, and 76. The servo motor may be any corresponding one of the servo motors 65, 81, and 82.

The circuit to the servo motor includes a two section, low pass filter 98, a "bridged T" stabilizer splitter indicated generally as the pre-amplifier 99, and the motor control or power amplifier, indicated generally at 100, together with a negative voltage feed back.

The frame 57 of the mannequin simulating compartment 56 includes a shelf 102 for a mount 103 in which a neck simulating shaft 104 is vertically journalled. The shaft 104 carries a support 105 for the head structure 106 and is driven by a receiving synchro-motor 107 whose circuit 108 includes a transmitting synchro-motor 109 located at the second station. The synchro-motor 109 includes a rotatable handle 110 so that the head 106 can be turned in either direction as dictated at the second station by the turning of the handle 110.

The handle 110 is also provided with a normally open switch 111 in the circuit 112 to a solenoid 113 to whose plunger 114 there is attached a return spring 115 anchored to standard 116 and a transversely disposed lower jaw simulating member 117. By this arrangement, so long as the switch 111 is closed, the jaw member 117 remains open.

A microphone 118 is shown at the second station and its circuit 119 includes an amplifier 120 and a loud speaker 121 suitably supported in the compartment 56.

From the foregoing, it will be appreciated that apparatus in accordance therewith is well adapted to meet a wide variety of requirements of use where it is desired that action at one station be reproduced at another station.

What I therefore claim and desire to secure by Letters Patent is:

1. Apparatus for simultaneously reproducing a drawing at a first station remote from a second station where the drawing is made, said apparatus comprising drawing boards, one at each station, a track and a rack at each station, a unit connected to said track to travel therealong and including a gear in mesh with the associated rack, each unit including a pair of concentric shafts, each of said shafts including a gear and a member, one member being in the form of a crank and the other member being a first arm part, a second arm part pivotally connected to the first arm part, a link parallel to said first arm and pivotally connected to said second arm part and to said crank, each second arm part including a drawing tool, the shafts of the second station unit traversing one edge of the second station board with the gears and members being located respectively on the rear and front faces thereof, and a connection between the corresponding gears of the two units operative to cause each gear at the first station unit to turn in predetermined relation to the turning of the corresponding gear at the second station.

2. In apparatus for simultaneously reproducing a drawing at a first station remote from a second station where the drawing is made, drawing boards, one at each station, a unit associated with each board including a pair of concentric shafts, each of said shafts including a gear and a member, one member being in the form of a crank and the other member being a first arm part, a second arm part pivotally connected to the first arm part, a link parallel to said first arm and pivotally connected to said second arm part and to said crank, and a connection between the corresponding gears of the two units operative to cause each gear at the first station unit to turn in predetermined relation to the turning of corresponding gears at the second station, each second arm part including a drawing tool and means attaching said tool to said second arm part for movement between drawing and non-drawing positions relative to the associated drawing board and yieldably held in its non-drawing position, and an operating circuit including a solenoid carried by the second arm part of the first station unit and connected to the associated tool and a normally open switch carried by the second arm part of the second station unit and closed when the associated tool is in its drawing position, the tool attaching means at the first station being in the form of a bell crank to one arm of which the tool is attached and the other arm of which is connected to the solenoid of that unit, said solenoid being of the double acting type, and means yieldably opposing movement of said tool from either position.

3. Apparatus for simultaneously reproducing action at a first station remote from a second station where the action is initiated, said apparatus comprising a track and a rack at each station, a unit connected to each track to travel therealong and including a gear in mesh with the associated rack, each unit including a pair of concentric shafts, each of said shafts including a gear and a member, one member being in the form of a crank and the other member being a first arm part, a second arm part pivotally connected to the first arm part, a link parallel to said first arm and pivotally connected to said second arm part and to said crank, and a connection between the corresponding gears of the two units operative to cause each gear at the first station unit to turn in predetermined relation to the turning of the corresponding gear at the second station, and a connection between the units operable to cause the rack-engaging gear at the first station to turn in predetermined relation to the turning of the corresponding gear at the second station.

4. In apparatus for simultaneously reproducing a drawing at a first station remote from a second station where the drawing is made, drawing boards, one for each station, and a drawing unit associated with each board, the drawing unit at the second station including a vertical support provided with a spindle-like element, a pair of concentric shafts supported by said element, each shaft including a gear and a member, a track, rotatable members carried by said support and engaging said track, a rack parallel to said track, said rack and said track being attached on the rear of the second station drawing board, antifriction means carried by said support engaging opposite sides of said rack, a gear meshing with said track, and means for effecting movement at the first station in response to the turning of any of said second station gears, said means including elements at said second station rotatably connected to said gears.

5. In apparatus for simultaneously reproducing a drawing at a first station remote from a second station where the drawing is made, drawing boards, one for each station, and a drawing unit associated with each board, the drawing unit at the second station including a vertical support provided with a spindle-like element, a pair of concentric shafts supported by said element, each shaft including a gear and a member, a track, rotatable members carried by said support and engaging said track, a rack parallel to said track, said rack and said track being attached on the rear of the second station drawing board, antifriction means carried by said support engaging opposite sides of said rack, a gear meshing with said rack, and means for effecting movement at the first station in response to the turning of any of said second station gears, said means including elements at said second station rotatably connected to said gears, said means being located on the side of said support opposite said gears and members.

6. In apparatus for simultaneously reproducing a drawing at a first station remote from a second station where the drawing is made, drawing boards, one for each station, and a drawing unit associated with each board, the drawing unit at the second station including a vertical support at the rear of said second station board provided with a spindle-like element projecting forwardly over the upper edge of said second station board, a pair of concentric shafts supported by said element, each shaft including a gear and a member, a rack adjacent the lower end of said support, a track parallel to said rack intermediate said rack and said element, said track and said rack being attached to said second station board, antifriction means carried by said support engaging said rack, a gear meshing with said rack, rotatable members engaging said track and carried by said support, and means for generating movement at the first station in response to the turning of any of said gears, said means including elements at said second station rotatably connected to said gears, corresponding elements at said first station, and a connection between corresponding elements of the two units operative to cause each gear at the first station to turn in predetermined relation to the turning of the corresponding gear at the second station.

References Cited in the file of this patent

UNITED STATES PATENTS

| | | |
|---|---|---|
| 512,089 | Bangerter | Jan. 2, 1894 |
| 646,190 | Parker | Mar. 27, 1900 |
| 767,938 | Gray | Aug. 16, 1904 |
| 863,351 | Brand | Aug. 13, 1907 |
| 1,347,695 | Gillespie | July 27, 1920 |
| 1,471,869 | Turner | Oct. 23, 1923 |
| 1,698,278 | Rowe | Jan. 8, 1929 |
| 2,105,904 | Dale | Jan. 18, 1938 |
| 2,459,253 | Tyrner | Jan. 18, 1949 |
| 2,494,663 | Lobosco | Jan. 17, 1950 |
| 2,614,181 | Consalvi et al. | Oct. 14, 1952 |

FOREIGN PATENTS

| | | |
|---|---|---|
| 295,951 | Germany | Dec. 29, 1916 |

OTHER REFERENCES

Crowne: Abstract of application Serial No. 566,875, published December 27, 1949, 629 O.G. 1156.